Oct. 20, 1970    J. V. SHANNON    3,535,025
MOSAIC PRISM STRUCTURE
Filed Jan. 5, 1968
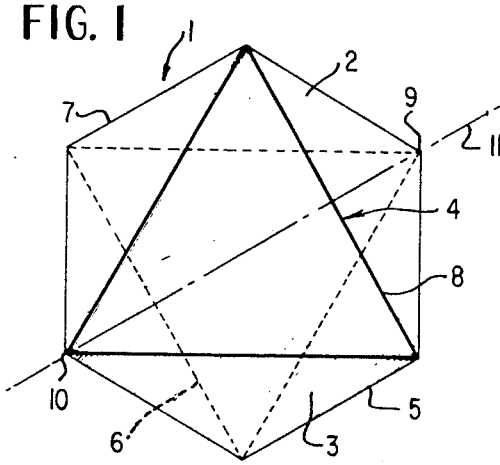
FIG. 1
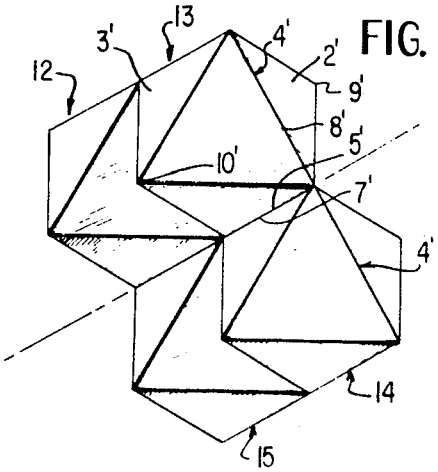
FIG. 3
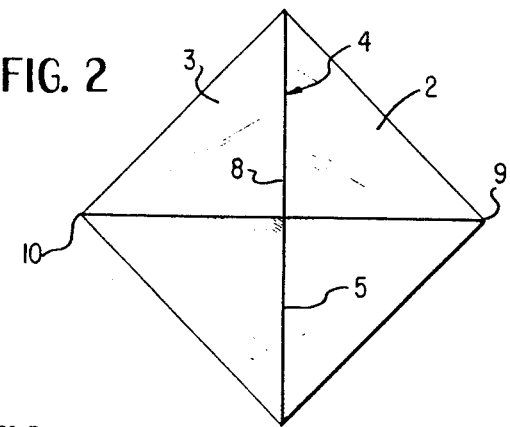
FIG. 2
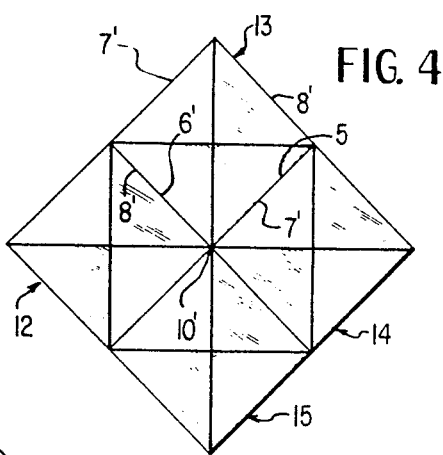
FIG. 4
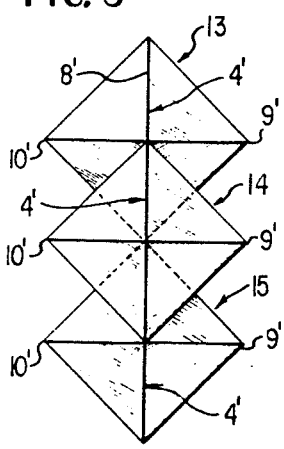
FIG. 5
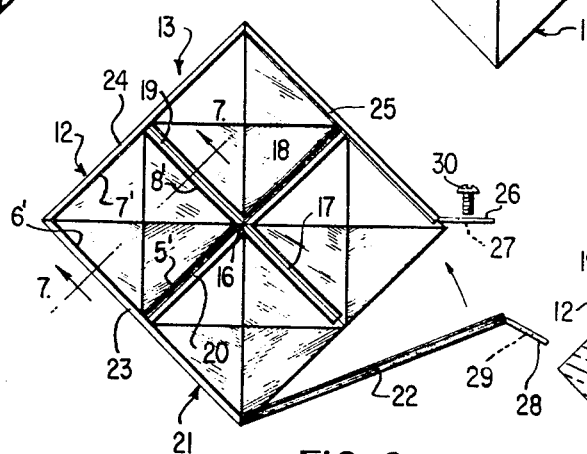
FIG. 6
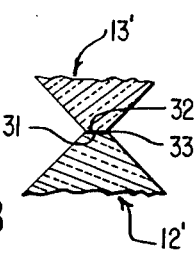
FIG. 8
FIG. 7
INVENTOR.
JAMES V. SHANNON

United States Patent Office

3,535,025
Patented Oct. 20, 1970

3,535,025
MOSAIC PRISM STRUCTURE
James V. Shannon, Alexandria, Va., assignor to General Electric Company, a corporation of New York
Filed Jan. 5, 1968, Ser. No. 701,033
Int. Cl. G02b 5/04
U.S. Cl. 350—286                    2 Claims

ABSTRACT OF THE DISCLOSURE

An optical scanning prism construction having four identical roof-prism elements which terminate in oppositely sloping planar viewing faces oriented in abutting relationship so that the roof edges of said prism elements form a common edge to constitute the central viewing axis of the composite member. The sloping planes in a prism element also intersect with each other at the midpoint of the element. A plurality of said members is placed in a side-by-side orientation to form a mosaic structure having the center cross section of all members lie in the same plane and the central viewing axes being parallel to each other. A supporting frame to hold the prisms in the desired orientation is also described.

DESCRIPTION OF THE INVENTION

This invention pertains generally to a mosaic prism structure and, more particularly, to a mosaic prism structure capable of scanning a complete hemisphere without image rotation.

There has been developed a composite prism which is capable of scanning a complete hemisphere without image rotation. This prism is in itself a composite structure formed, for example, from a plurality of Wirth prisms, as described and claimed in my copending application Ser. No. 371,255, filed June 1, 1964 (Docket 35-53D-305). The unique capabilities of this prism make it extremely useful in many arrangements. However, the aperture of the composite prism is proportional to its physical cross section. Thus, when it is necessary to utilize large apertures, this prism becomes large, and this introduces undesirable characteristics. Among these undesirable characteristics are light losses due to the long light path. Another undesirable characteristic is the weight and size of the prism, which makes it difficult to mount, requires more complex and costly scan drive mechanisms, and greatly increases the weight of the equipment in the overall scan system. Finally, such a prism requires large optical quality components whose cost increases as an exponential function of size.

Reduction of the light loss, size, and weight of the prism is a highly desirable goal. The present invention achieves this goal by placing in a mosaic structure a plurality of individual prism elements each having the sloping end plane construction and cooperating roof edge described in my aforementioned copending patent application but lacking the planar surfaces which define the central body portion of the prism elements therein disclosed. Shortening the prism elements by elimination of the central body portion in this manner achieves the foregoing specified goal without losing the capability to scan a complete hemisphere with the composite prism. The desired result is also achieved without any loss of aperture size by utilizing an appropriate number of smaller prism members in the mosaic structure. Since the prism members that constitute the mosaic structure are smaller than a single prism having an equivalent aperture, the length of the light path through the mosaic prism structure is greatly decreased and, consequently, the light loss is greatly decreased also. Similarly, the decrease in size of the individual prism members utilized results in an overall decrease of size and weight.

Therefore, it is an object of this invention to provide a prism structure which substantially reduces light loss.

Another object of this invention is to provide a prism structure capable of scanning a complete hemisphere without image rotation which has a large aperture with respect to its size, weight and light loss.

It is a further object of this invention to provide a prism structure which simplifies mounting and also simplifies and reduces the cost of associated drive mechanisms.

It is a still further object of this invention to provide a prism structure which greatly reduces the amount of optical quality material required to provide the same aperture.

Other objects and advantages of my invention will become apparent as the following description proceeds and the features of novelty which characterize my invention will be pointed out with particularity in the claims annexed to and forming part of this specification.

For a better understanding of my invention, reference may be made to the accompanying drawings in which:

FIG. 1 is a perspective view of one form of a single composite prism capable of scanning a complete hemisphere without image rotation;

FIG. 2 is a side elevation of the prism of FIG. 1;

FIG. 3 is a perspective view of a mosaic prism structure including a plurality of prism members in accordance with this invention;

FIG. 4 is a front elevation of the mosaic prism structure shown in FIG. 3;

FIG. 5 is a side elevation of a mosaic prism structure shown in FIG. 3;

FIG. 6 is a front view of the mosaic prism structure showing a particular mounting means;

FIG. 7 is a section view on line 7—7 of FIG. 6; and

FIG. 8 is a section view showing an alternative form of mounting the prism elements in the mosaic structure.

Briefly, in one form thereof, this invention involves placing a plurality of composite prism members in a mosaic structure to achieve the aforementioned objects. The mosaic is formed by assembling a plurality of composite identical prism members in abutting relationship with the center cross section of all prism members disposed in a single plane. Each of the prism members is also a composite assembly of prism elements, each comprising four identical roof-prism elements joined together in abutting relationship so that the roof edge in each prism element provides a common edge constituting the central viewing axis of the member so formed. Each prism element is defined by oppositely sloping planes which intersect at the center cross section for the composite prism member and intersect the roof edge at opposite ends of the element to form a common acute angle between said sloping plane and the central viewing axis. The intersection of all sloping planes with said central viewing axis at each end of the abutting elements is at a common point.

The optical axes of all the individual prism members are arranged in parallel. The composite prisms are mounted in the desired relationship by a frame having a plurality of legs each extending between adjacent prism elements and engaging the juxtaposed sides or edges of such prism members. In the latter embodiment, the adjacent edges may be ground to form flat surfaces and then bonded together at these flat surfaces to form the mosaic structure.

Referring now to FIGS. 1 and 2, a single composite prism of the type above generally described for practice of this invention is depicted. Said prism has an exterior shape in the form of a pair of square pyramids 2 and 3 placed base to back. The plane in which the bases of pyramids 2 and 3 lie has a square, center cross section. For ease of reference this center or central cross section will be hereinafter referred to as center section 4. This center section 4 has sides 5, 6, 7, and 8. Pyramid 2 has a vertex 9 and pyramid 3 has a vertex 10. The solid line 11 drawn between vertex 9 and vertex 10 indicates the optical or viewing axis of composite prism 1.

The composite prism shown in FIGS. 1 and 2 further comprises a composite array of four identical roof-prism elements joined together in abutting relationship at the roof edges to form a common edge constituting the central viewing axis 11 of the prism. An individual prism element in the construction can be identified in FIG. 1 as the solid figure bounded by lines a-b, b-c, c-d, a-d, and b-d. A roof edge is defined between planar surfaces a-b-d and b-c-d while planar surfaces a-b-c and a-c-d provide the sloping viewing faces for said prism element. Intersection of said sloping faces along line 8 defines one edge of the center cross section in the composite prism member. Said sloping faces or planes also intersect central viewing axis 11 to form a common acute angle between each sloping plane and the central viewing axis. In like manner, three other identical prism elements are grouped about the central viewing axis to form the composite member such that all sloping planes at one end of said member intersect at point 10 while all sloping planes at the opposite ends of said elements intersect at point 9.

The present embodiment of FIGS. 1 and 2 has the end viewing faces of the basic composite prism in abutting relationship thereby eliminating any central body portion in the member. This represents an idealized construction having a maximum aperture over the field of scan when the prism is rotated. The construction is particularly useful for applications having high intensities of illumination.

Turning now to FIGS. 3, 4, and 5, a mosaic prism structure formed with composite prism members 12, 13, 14, and 15, in accordance with the present invention is illustrated. Each of the prism members 12, 13, 14 and 15 is identical in shape and construction to prism 1 depicted in FIGS. 1 and 2, but is smaller in size. Each prism may, therefore, be considered for ease of visualization as having the shape of two square pyramids 2' and 3' placed base to base. Each composite prism is capable of scanning an optical line of sight through a complete hemisphere without image rotation. Each prism has one side of its center section 4' abutting a first adjacent prism and a second side of its center section 4' abutting a second adjacent prism. For example, prism 13 has side 5' abutting side 7' of prism element 14 and, as may be better seen in FIG. 4, side 6' abutting side 8' of prism 12. Each of the other prisms in the mosaic prism structure is similarly arranged because of the square aperture of the resultant mosaic prism structure of this specific embodiment. It can be seen that the center sections 4' of the prisms are all arranged in a common plane. This plane is perpendicular to the optical or viewing axis of each prism at the midpoint of said axis.

A comparison of the side views of FIGS. 2 and 5 shows the advantages of the mosaic prism structure of the present invention over a single composite prism for the same size aperture. The total length of the assembled array in FIG. 5 is only half that of the single prism of FIG. 3. This reduction in length accomplishes three beneficial results: (1) reduction of the length of light path with corresponding reduction of light loss; (2) reduction in size, facilitating handling, mounting, and scanning; and (3) corresponding reduction in weight, thereby diminishing problems of supporting the resultant mosaic prism structure and the weight of equipment utilizing the mosaic prism structure. These results are all achieved by the mosaic prism structure of this invention without diminishing the aperture, and the resultant field of vision does not differ from that of the single prism of much greater bulk.

While the previous discussion comparing the two prism arrangements has specifically involved a particular embodiment in which the mosaic prism structure comprises four composite prisms, this invention is in no manner restricted to the use of four prism members in the mosaic prism structure, nor is this invention limited to the arrangement of the composite prisms to provide a square aperture. For instance, a rectangular aperture may be achieved by placing two of the prisms in abutting relationship. Again, three of said prisms could be placed together to form an L-shaped aperture. Restrictions on the shape and size of the aperture and the number of such prisms included in the mosaic prism structure will depend only upon the characteristics desired and the amount of money that is to be invested in manufacturing and assembling the mosaic prism structure.

Mounting of the composite prisms becomes quite important since it is necessary to have the optical axes of the individual prisms parallel to each other and the center sections arranged in a common plane. FIGS. 6 and 7 illustrate a mechanical mounting means which has proved successful. In this arrangement an X-shaped supporting frame 16, having individual legs 17, 18, 19, and 20, is employed to hold and position the individual prisms. Each of the arms 17, 18, 19, and 20 has an X-shaped cross section, as may be seen in FIG. 7, wherein the cross section of arm 19 is illustrated. Still referring to FIG. 7, it may be seen that one side of the X-shaped cross section cradles one side of a prism, namely side 8' in the drawing, while the opposite side of the X-shaped cross section cradles the side of a second prism, side 6' in the drawing. The X-shaped supporting frame 16 must be carefully machined to close tolerances to position the individual prisms in exact relation with the optical axes parallel.

After the prisms have been positioned about the X-shaped supporting frame, it is necessary to hold them in these positions. This is achieved by utilizing an angle type outer frame 21, the arm 22 of which is illustrated in exploded form in FIG. 6. Outer frame 21 has four sections 22, 23, 24, and 25. Each of these sections has a cross section similar to one-half of the X-shaped cross section of the X-shaped supporting frame, that is, it has a V-shaped cross section, and the outer frame cradles the outer sides of an individual composite prism in the same manner that the X-shaped supporing frame cradles the inner sides. This is illustrated in FIG. 7, wherein side 6' of prism 12 is cradled by section 23 of the angle shaped outer frame 21. Placing the angle type outer frame 21 completely around the perimeter of the mosaic prism structure holds the individual prisms in position in the X-shaped supporting frame. One arrangement for holding the outer frame 21 in assembled relation is illustrated in FIG. 6. Specifically, the end of section 25 is formed to include one ear 26 having an opening 27 therein. The section 22 similarly is formed to include an ear 28 having a threaded opening 29 therein. A screw 30 extends through opening 27 and is threadedly received in opening 29 to hold the outer frame 21 in assembled relation.

An alternative mounting arrangement is illustrated in FIG. 8. In this arrangement adjacent sides of a composite prism, such as a side of prism 13' and an adjacent side of a prism 12' (these prisms corresponding to prisms 13 and 12, respectively, of the form shown in FIGS. 6 and 7) are ground away, or chamfered, to form flat surfaces 31 and 32, respectively. Care must be taken to properly grind the sides in order to insure that the optical axes of the individual prism elements will be parallel. After flat surfaces have been formed at the adjacent sides, the prisms may be assembled and the prisms joined together by any suitable bonding material to form a joint 33 as shown in FIG. 8. This mounting system is preferable when large numbers of fairly small prisms are to be formed in a mosaic system, while the mechanical mounting system is preferable when a few relatively large prisms are to compose the mosaic system.

The number of composite prisms utilized in the mosaic system will depend upon a number of factors. Of course, it is desirable to reduce light loss, size and weight for a given aperture as much as possible. The greater the number of individual prisms utilized in the mosaic system, the greater the reduction in light loss, size and weight. As the prisms utilized become smaller, however, the difficulty encountered in mounting and aligning them correspondingly increases. Thus, for any desired aperture, the number of prisms utilized in the mosaic prism structure will depend upon a comparison of the results desired with the increased cost involved in manufacturing and assembling larger numbers of smaller prisms.

It is not desired to limit this invention to the particular construction shown and described, but to cover all modifications and changes within the spirit and scope of the invention by the appended claims.

What is claimed as new and desired to be secured by Letters Patent of the United States is:

1. A mosaic scanning prism structure comprising:
   (a) a plurality of composite identical prism members joined together in abutting relationship at the edges defining a square center cross section for each of said prism members so that all said cross sections lie in a single plane,
   (b) each of said prism members having an exterior shape of a pair of square pyramids placed base to base with the bases forming said square cross section,
   (c) said prism members each comprising four identical roof-prism elements joined together in abutting relationship so that the roof edge in each prism element provides a common edge constituting the central viewing axis of the member,
   (d) each prism element being defined by oppositely sloping planes which intersect to provide one base edge of the square cross section for the composite prism member and intersect the roof edge at opposite ends of the element to form a common angle between said sloping plane and the central viewing axis,
   (e) the intersection of all sloping planes with said central viewing axis at each end of the abutting prism elements being at a common point, and
   (f) the central viewing axes for the assembled prism members all being parallel to one another.

2. A mosaic scanning prism structure as in claim 1 having mounting means for supporting the prism members in the mosaic prism structure with said center cross sections all being disposed in a single plane, at least one side of said center section of each prism member abutting a side of said center section of another of said prism members, and the mosaic prism structure having an optical axis parallel to the optical axes of said prism members.

References Cited

UNITED STATES PATENTS

| | | | |
|---|---|---|---|
| 2,855,819 | 10/1958 | Luboshez | 350—182 |
| 3,320,019 | 5/1967 | Brunelle et al. | 350—286 |
| 3,382,023 | 5/1968 | Van Horn | 350—286 |

FOREIGN PATENTS 1,042,671  11/1950  France.

DAVID SCHONBERG, Primary Examiner

M. J. TOKAR, Assistant Examiner

U.S. Cl. X.R.

350—6, 7, 102, 285